United States Patent [19]

Imazaike

[11] 4,365,525

[45] Dec. 28, 1982

[54] DAMPER

[76] Inventor: Yasutaka Imazaike, 8-22, Tanabe-nishinocho, Higashi-sumiyoshi-ku, Osaka, Japan

[21] Appl. No.: 160,357

[22] Filed: Jun. 17, 1980

[30] Foreign Application Priority Data

Jul. 5, 1979 [JP] Japan .................................. 54-85649

[51] Int. Cl.³ ...................... F16H 57/10; F16D 13/76
[52] U.S. Cl. ....................................... 74/768; 74/410; 74/411; 192/20; 360/96.6
[58] Field of Search ............. 74/768, 797, 801, 750 R, 74/785, 410, 411; 192/20, 41 S; 360/96.6

[56] References Cited

U.S. PATENT DOCUMENTS

| | | | |
|---|---|---|---|
| 641,097 | 1/1900 | Gerard | 74/768 |
| 850,981 | 4/1907 | Tillotson | 192/41 S |
| 3,217,848 | 11/1965 | Tout-Kowsky et al. | 192/41 S |
| 3,296,893 | 1/1967 | Shaffer et al. | 74/750 R |
| 3,800,323 | 3/1974 | Jenkins | 360/96.6 |
| 4,133,344 | 1/1979 | Hunter et al. | 74/768 X |

Primary Examiner—George H. Krizmanich
Attorney, Agent, or Firm—Jordan and Hamburg

[57] ABSTRACT

A damper of the gear type useful for a movable portion of video tape decks and other apparatus, comprising a damper case formed with an internal gear on its inner periphery, a sun gear shaft having an input shaft at its one end and rotatably disposed in the center of the damper case, and planetary gear units provided around the sun gear shaft and arranged in a plurality of stages along the sun gear shaft, each comprising a sun gear, a plurality of planetary gears and the internal gear. The planetary gears of the unit in the first stage are rotatably supported by the input shaft. The planetary gears of each of the other stages are rotatably supported by the sun gear of the immediately preceding unit. The meshing engagement of the multi-stage gear stage gives resistance, for example, to a spring for withdrawing the tape accommodating portion of a video tape deck to produce a damping effect.

7 Claims, 6 Drawing Figures

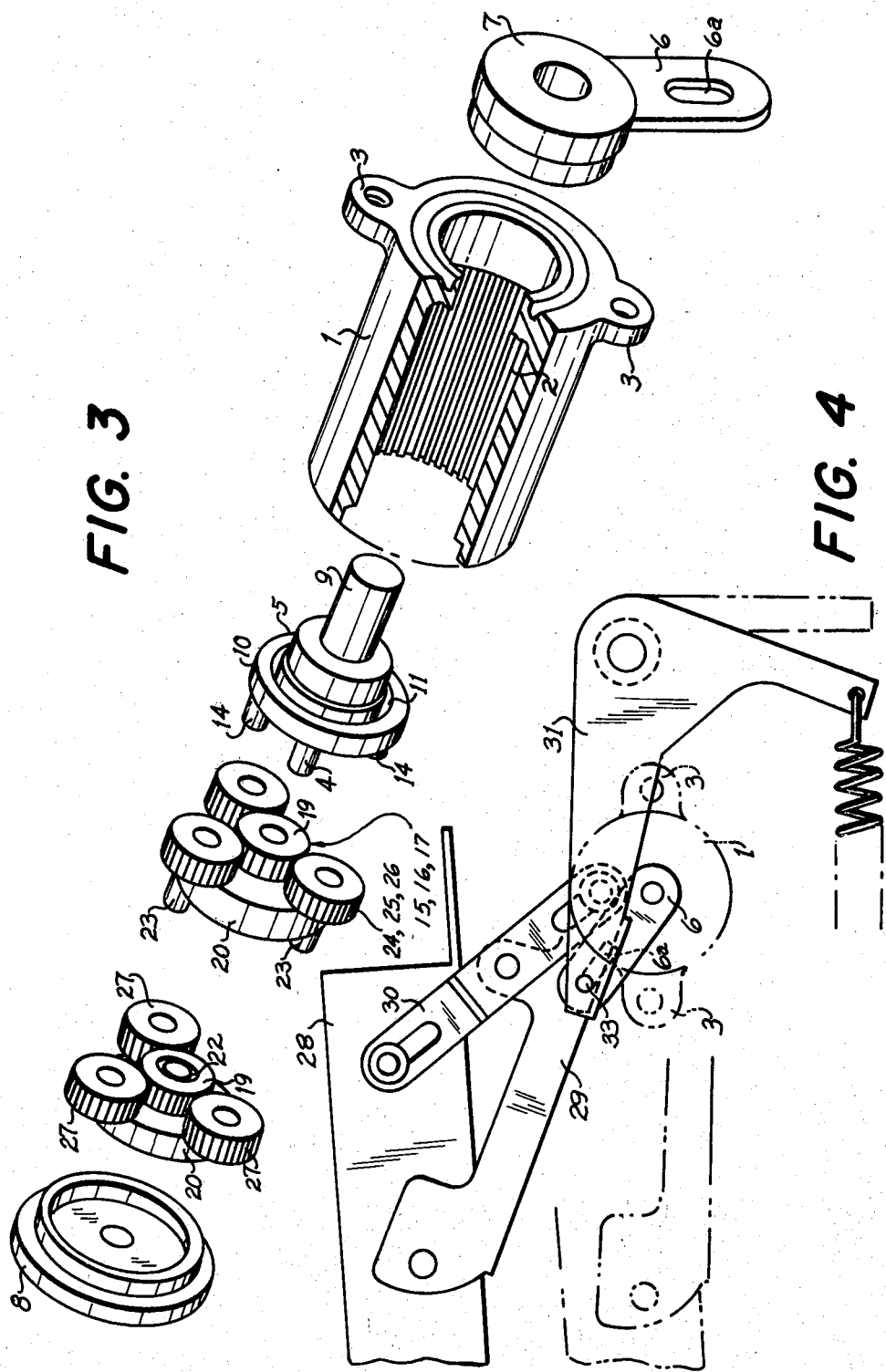

DAMPER

The present invention relates to a damper of the gear type useful for movable portions of various apparatus, such as mechanisms for loading a video tape deck with a tape.

With video tape decks, for example, the tape accommodating portion is adapted to project from the deck under the action of a spring when the deck is to be loaded and unloaded, and a damper of the gear type is used for resisting the spring force to cause the tape accommodating portion to project gently. A conventional gear-type damper comprises a speed change assembly of a multiplicity of spur gears arranged in meshing engagement with one another to give a progressively increasing speed from gear to gear. The damper is coupled to a loading mechanism provided for the tape accommodating portion, such that the loading mechanism, when operating to project the accommodating portion, delivers the operating force to the damper, which in turn acts against the loading mechanism through its gear assembly.

Such a conventional spur gear-type damper has the drawbacks of being large-sized, necessitating a large space for installation; being cumbersome to assemble; and giving forth loud noise due to the meshing of the gears.

The present invention has overcome these drawbacks of such a conventional device. An object of the invention is to provide a damper in which a multi-stage planetary gear mechanism is used to achieve a damping effect as high as or higher than is produced by a conventional device while rendering the damper compact in construction and easy to assemble.

Another object of the invention is to provide a damper in which all the gears are enclosed in a case to confine the meshing noise of the gears within the case to the greatest possible extent and thereby muffle the noise.

Still another object of the invention is to provide a damper including an input assembly in which a driving input wheel is coupled to an input shaft for internal planetary gear units by a one-way spring clutch to render the damper operable only when loaded in a specified direction, such that when the damper is used, for example, for a video tape deck, the tape accommodating portion can be pushed in easily and free of resistance.

Other objects and advantages of the invention will become apparent from the following description of embodiments with reference to the accompanying drawings, in which:

FIG. 3 is an exploded perspective view of the damper;

FIG. 4 is a side elevation schematically showing the loading mechanism of a video tape deck having the damper incorporated therein;

Figure 2:
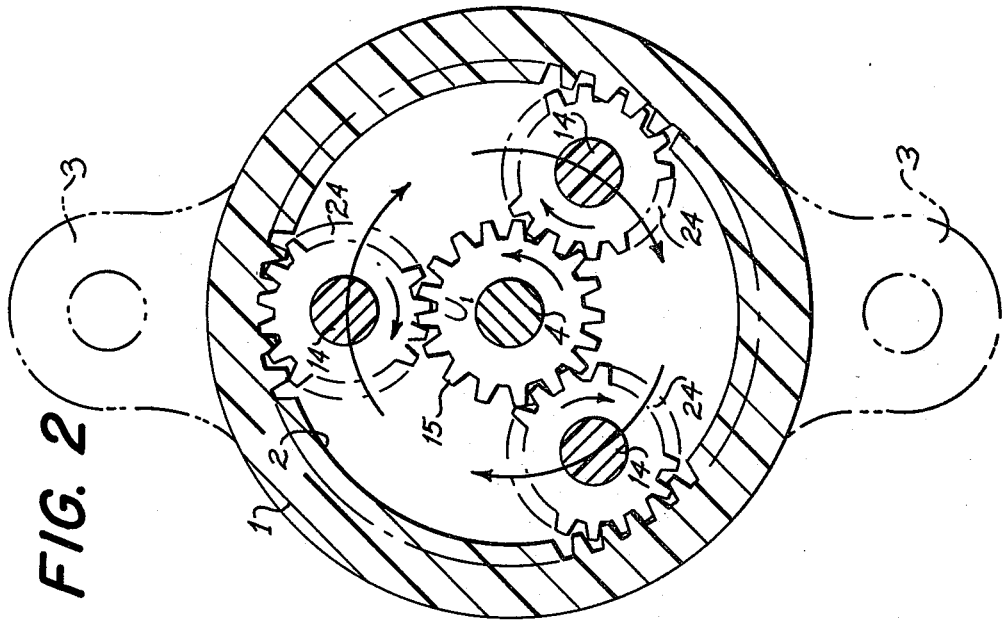
FIG. 2 is a view in section taken along the line II—II in FIG. 1.
Figure 1:
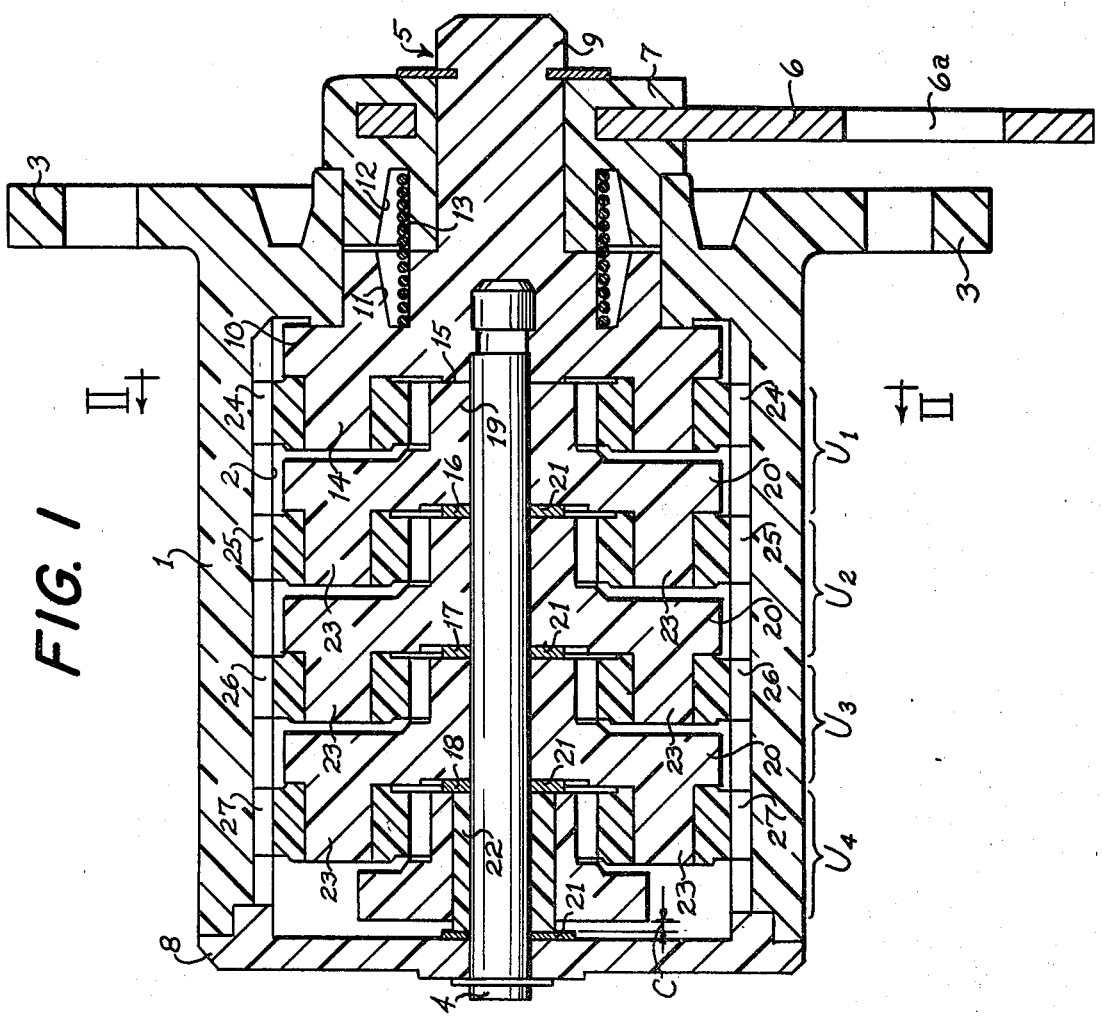
FIG. 1 is an enlarged view in section showing a damper of the invention.

With reference to FIGS. 1 to 4 showing the basic embodiment, a damper case main body 1 is integrally formed with an internal gear 2 on its inner peripheral surface and attaching portions 3 at its one end for mounting the damper, for example, on the frame of a video tape deck. A sun gear shaft 4 is fixedly provided at its forward end with an input shaft 5, on which an input wheel 7 having an input lever 6 is rotatably mounted. The input shaft 5 and the input wheel 7 are rotatably fitted in the front end of the case main body 1. A lid 8 is attached to an opening at the rear end of the main body 1. The main body 1 and the lid 8 provide a damper case. The sun gear shaft 4 is rotatably supported at its rear end by the center portion of the lid 8. Thus the sun gear shaft 4 is rotatably disposed in the center of the damper case. The main body 1, input shaft 5, input wheel 7 and lid 8 are made from synthetic resin, such as polyacetal, having high strength and suitable elasticity. The sun gear shaft 4 and the input lever 6, which are made of metal, are made integral with the input shaft 5 and the input wheel 7, respectively, by insert molding.

The input shaft 5 includes a rod portion 9 having the input wheel 7 rotatably mounted thereon and a stepped disk portion 10 formed with an annular recess 11 in its front side. In opposed relation to the recess 11, an annular recess 12 is formed in the rear side of the input wheel 7. A one-way spring clutch 13 is disposed in the recesses 11 and 12. The spring clutch 13 delivers the rotation of the input wheel 7 to the input shaft 5 in one direction only. Thus, in a typical loading mechanism for the tape accommodating portion of the above-mentioned tape deck, only when the operating force of the mechanism acting to project the accommodating portion is applied to the input wheel 7 through the input lever 6, will the force be delivered to the input shaft 5 via the spring clutch 13. Thus, when the input wheel 7 rotates in the same direction of the helical winding of the spring clutch 13, the spring clutch 13 contracts radially to grip the input wheel 7 and the input shaft 5 to provide a drive connection therebetween during loading. However, when the input wheel 7 is rotated in the opposite direction during unloading, the spring clutch 13 does not contract radially and the rotation of input wheel 7 is not imparted to input shaft 5. The spring clutch 13 can be replaced by some other one-way clutch. Depending on the use of the damper of the invention, the input wheel 7 may alternatively be connected directly to the input shaft 5 without using such a clutch. In either case three planetary gear shafts 14, extending from the rear side of the disk portion 10 of the input shaft 5, are arranged at specified spacing along the periphery of the disk portion.

Sun gears 15, 16, 17 and 18 each comprise a toothed main portion 19 and a disk portion 20 integral with the main portion and are rotatably mounted on the sun gear shaft 4, with the main portion 19 of each gear facing the disk portion 20 of the next adjacent gear. Thrust washers 21 are interposed between the gears. Another thrust washer 21 is provided between the lid 8 and the sun gear 18 in the last stage. The thrust washers 21 are made of a material, such as Teflon, having a small coefficient of friction and diminish the friction between the sun gears. The last sun gear 18 has fitted therein a thrust bushing 22 in the form of a tube made of synthetic resin, such as polyacetal, which is longer than sun gear 18 by a specified dimension. The thrust bushing 22 forms a clearance C, corresponding to this dimension, between the sun gear 18 and the thrust washers 21 on its opposite sides to render the gear 18 free to move axially within the range of the clearance C.

Each of the sun gears 15 to 17 has planetary gear shafts 23 extending from the rear side of the disk portion 20 corresponding to the planetary gear shafts 14 on the input shaft 5.

Sun gears 15 to 18 are provided therearound with planetary gears 24, 25, 26 and 27, respectively, that is, each sun gear has three such planetary gears equidistantly arranged about its circumference. The planetary gears 24 to 27 are in mesh with the main portions 19 of the corresponding sun gears 15 to 18 and also with the internal gear 2 of the case main body 1.

Thus the planetary gear units, each comprising a sun gear, three planetary gears and an internal gear (which is a common component of all the units), are arranged in axial four stages in alignment. The planetary gears 24 of the unit U1 in the first stage adjacent the input shaft 5 are rotatably supported on shafts 14 on the input shaft 5. The planetary gears 25, 26 and 27 of the second and following units U2 to U4 are rotatably supported on the planetary gear shafts 23 of the sun gears 15, 16 and 17, respectively, the planetary gears of each of these units being so supported by the sun gear of the preceding unit. With this arrangement, the rotation of the input shaft 5 is first transmitted to the planetary gears 24 of the unit U1 in the first stage, causing the gears 24 to rotate about their own axes and also revolve around the sun gear 15. This rotates the sun gear 15. The rotation of the sun gear 15 is delivered to the sun gear 16 of unit U2 in the second stage through the planetary gears 25 of the same unit. In this way the rotation is delivered to the sun gear 18 of unit U4 in the fourth stage at a progressively increasing speed.

The ratio of revolution number of the sun gear 18 of the planetary gear unit U4 in the final stage to the revolution number of the input shaft 5, namely, the ratio of speed increase afforded by the damper is determined by the numbers of the teeth of each of the sun gears 15 to 18, of each of the planetary gears 24 to 27 and of the internal gear 2 of the case main body 1. Assuming that both the sun gears and the planetary gears have 15 teeth and the internal gear 2 has 45 teeth, the speed increase ratio provided by the unit U1 in the first stage is 4 and is successively increased finally to a ratio of 256. In other words, when the input shaft 5 makes one turn, the number of revolutions of the sun gear 18 in the final unit U4 is 256.

Like the damper case, the sun gears 15 to 18 and the planetary gears 24 to 27 are all made of synthetic resin, such as polyacetal. When thus made of synthetic resin, the gears are inexpensive and produce greatly reduced meshing noises. Even if the gears are made of metal, however, the meshing noises will be muffled as contemplated according to the invention. When desired, the sun gear 18 of the final unit U4 may be provided with a flywheel attached to the disk portion 20 to assure smooth rotation. With conventional dampers comprising a speed change spur gear assembly, the spur gear in the final stage, which is in mesh with the adjacent gear at only one side thereof, is liable to rotate unstably and therefore invariably necessitates a flywheel so as to operate properly, whereas with the present damper in which a planetary gear mechanism is used, the sun gear 18 in the final stage is inherently rotatable with high stability without any flywheel. Accordingly the flywheel may be used only when it is desired to render the gear 18 rotatable with improved smoothness.

To assemble the damper, the planetary gear units U1 to U4 are placed on the sun gear shaft 4 with the opposed sun gears and the planetary gears fitted together, and the assembly is placed into the case main body 1 through its rear end opening with the planetary gears 24 to 27 in all stages brought into meshing engagement with the internal gear 2. The lid 8 is then attached to the rear end opening of the main body 1, and the input wheel 7 is fitted to the shaft 5 with the spring clutch 13 provided therebetween. Since all the gears are arranged around the single sun gear shaft 4, the damper is very easy to assemble.

The damper may be incorporated into a loading and unloading mechanism for the tape accommodating portion 28 of a video tape deck as seen in FIG. 4, wherein the loaded position is shown in solid lines and the unloaded position is shown in broken lines. FIG. 4 shows links 29 and 30 for withdrawing the accommodating portion 28 and a drive link 31 connected to a spring 32 serving as a drive source. The force of the spring 32 turns the drive link 31, which in turn moves the withdrawing links 29 and 30 to project the accommodating portion 28 from the deck, that is, from the loaded position represented by solid lines to the unloaded position represented by broken lines in FIG. 4. A pin 33 on the link 31 is engaged in a slot 6a of the input lever 6 of the damper to couple the link 31 to the lever 6 and deliver the torque of the drive link 31 to the damper via the input lever 6. The damper is attached to a suitable interior portion of the video tape deck with the attaching portions 3 and 3 of the case main body 1.

When the torque of the drive link 31 is coupled to the damper, the input wheel 7 turns, the rotation of which is transmitted to the input shaft 5. As already stated, the rotation of the input shaft 5 is delivered to the planetary gear units U1 to U4 in four stages at a progressively increasing speed, whereby resistance acts on the drive link 31 to load the spring 32, consequently causing the tape accommodating portion 28 to project gently. The magnitude of the resistance acting on the drive link 31 is in proportion to the speed increase ratio of the damper. It therefore follows that when the speed increase ratio is increased to give greater resistance within the range not exceeding the force of the spring 32, the accommodating portion 28 will be withdrawn more gently. When the accommodating portion 28 is pushed into the deck, the torque of the drive link 31, although delivered to the input wheel 7, will not be further transmitted by the action of the spring clutch 13. Thus the accommodating portion can be fitted in place easily free of resistance. It will be seen that when the input lever 6 is rotated in the same direction as the direction of the helical winding of the spring clutch 13, the spring clutch 13 engages and the rotation of input wheel 7 is transmitted to input shaft 5 to provide the damping effect during loading, that is, during the time the accommodating portion 28 is moved from the unloaded position represented by broken lines in FIG. 4 to the loaded position represented by solid lines in FIG. 4. On the other hand, during unloading, that is, when the accommodating portion 28 is moved from the loaded position represented by solid lines in FIG. 4 to the unloaded position represented by broken lines in FIG. 4, the spring clutch 13 is not engaged so that input shaft 4 is not rotated and there is no damping effect. Thus the damping effect is applied only during loading and not during unloading.

According to the present invention which provides a multi-stage planetary gear assembly, the damper can be built inherently compact and can achieve a greater speed increase than conventional spur gear assemblies, with the result that the damper can be made much more compact than similar conventional devices. In other words, a damping effect equivalent to that afforded by conventional devices can be given by a greatly compacted damper according to the invention. The speed increase ratio is of course variable as desired by varying the number of the planetary gear units or the number of gear teeth and, moreover, can be increased without entailing a great increase in the size of the damper. With all the gears enclosed in the damper case, the meshing noises of the gears can be effectively confined therein. In fact, the damper of the present embodiment will give forth almost no noise since the damper case comprising the main body 1 and the lid 8 is closed with the input shaft 5 and is of sealed construction in its entirety.

The sun gear 18 of the last unit U4, which rotates at a very high speed, appears likely to stop when encountering even a small resistance because its torque is inversely proportional to the speed of its rotation. To overcome this potential objection, the sun gear 18 of the damper has fitted therein a thrust bushing 22 longer than the gear 18 and bearing at its axial ends against the thrust washers 21 on each side of sun gear 18 so as to be freely movable axially within the range afforded by the clearance C. Whereas the sun gear 18 is otherwise likely to be halted by an axial thrust resulting from the rotation of the sun gears 15, 16 and 17 in the units U1 to U3, the clearance assures the rotation of sun gear 18, because sun gear 18 will not be pressed on and restrained by the thrust washers 21 on its opposite sides. Sun gear 18 is thus smoothly rotatable at all times for proper operation in whatever orientation of the damper may be used.

With the present damper, there is no particular starting point or end point for the rotation of the units U1 to U4, so that the damper is operable free of any problem, with the input lever 6 in any position radially of the damper as connected directly to the input wheel 7. Thus the input lever 6 is positionable in any radial direction over the range of 360° in accordance with the position of the drive link 31 of the loading mechanism. On the other hand, many conventional dampers have the input portion of the damper coupled to a loading mechanism by an input lever having one end engaged with the drive link of the loading mechanism and the other end provided with a sector gear in mesh with the input gear of the damper. Such a damper is cumbersome to incorporate into the loading mechanism since the input lever must be positioned in a specified radial direction relative to the damper due to the presence of the sector gear. The present damper, however, may be easily incorporated into a video tape deck because the orientation of the input lever is not so limited.

Figure 6:
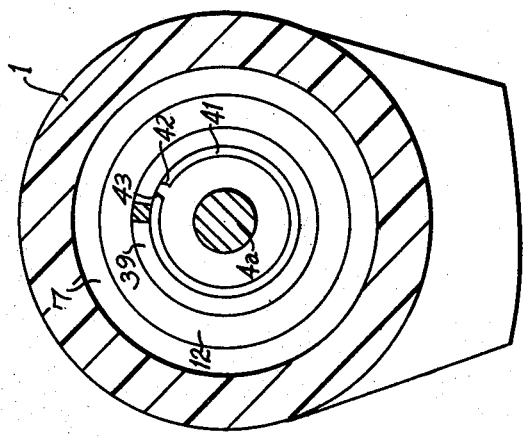
FIG. 6 is a view in section taken along the line VI—VI in FIG. 5.
Figure 5:
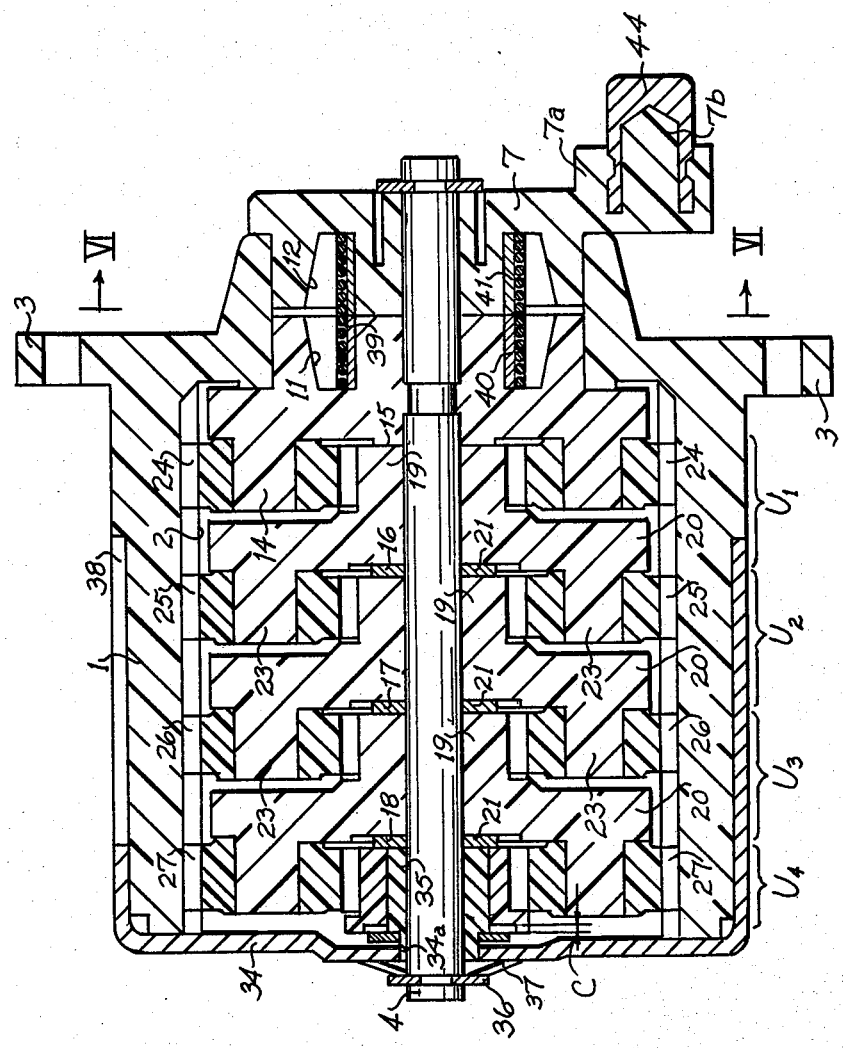
FIG. 5 is an enlarged view in section showing another embodiment of the damper.

Another embodiment of the invention will be described with reference to FIGS. 5 and 6. Throughout the accompanying drawings, like parts are referred to by like reference numerals. Only the features of the second embodiment as distinct from the basic embodiment will be described.

The first of the features relates to the structure of the case. Indicated at 34 is an iron or like metal cap in the form of a bottomed hollow cylinder and press-fitted to the case main body 1 from the rear. Since the rear end opening of the case main body 1 is closed with the cap 34, the lid 8 used in the basic embodiment can be omitted. In other words, the case main body 1 and the end wall of the cap 34 constitute the damper case. The sun gear 18 in the last stage has fitted therein a thrust bushing 35, which in this embodiment extends rearward and fits in a center bore 34a in the cap 34, which serves also as a bearing for the rear end of the sun gear shaft 4 extending through the bore 34a. Indicated at 36 is a washer fitted to the rear end of the sun gear shaft projecting from the cap, and at 37 a retaining plate spring provided between the washer 36 and the cap 34. The cap 34 is formed with several slits 38 in its peripheral side wall extending from the front end of the cap axially thereof over a suitable distance to permit the expansion and contraction of the plastics case main body 1 due to variations in temperature.

Cap 34, overlying a portion of the outer periphery of main body 1 over the, diminishes the vibration of the main body 1 delivered thereto from the gears and thereby effectively muffles the noises produced by the gears.

Another feature of the second embodiment relates to the input assembly of the damper. As shown in FIG. 5, a lever 7a integral with the input wheel 7 is integrally formed at its free end with a projection 7b provided with a metal cover 44. The projection 7b is adapted to engage in a slot (not shown) formed in the drive link 31 shown in FIG. 4. Alternatively, input assembly can be otherwise coupled to the input source by any desired means, such as by a gear.

Although the input wheel 7 is rotatably mounted on the rod portion 9 of the input shaft 5 in the basic embodiment, the input wheel 7 of the second embodiment is rotatably mounted on a forward extension 4a of the sun gear shaft 4. More specifically stated, the input shaft of the embodiment shown in FIG. 5, and corresponding to the input shaft 5 of the basic embodiment, comprises the extension 4a of the sun gear shaft and a disk portion 10' fixed to the extension 4a, with the input wheel 7 rotatably fitted to the extension 4a. The disk portion 10' has planetary gear shafts 14 projecting from its rear side and a recess 11 in its front side for a spring clutch 39.

Another feature of the present embodiment resides in the construction of the spring clutch 39. The clutch 39 comprises a spring of square wire and is provided in recesses 11 and 12 of the input shaft and the input wheel 7 respectively around metal pipes 40 and 41. As seen in FIG. 6, each of the metal pipes 40 and 41 has an axial slit 42 formed in the wall thereof over the entire length of the pipe. Ribs 43 on the recess defining walls of the input shaft and input wheel 7 are engaged in the slits 42 of the pipes 40 and 41 to hold these pipes against idle rotation.

With this arrangement, the spring clutch 39 will not bite into the clutch winding portions of the input shaft and the input wheel 7, especially at the adjoining portions of these members even when these portions wear. The clutch is therefore in operation.

The number of the planetary gears in each of the units U1 to U4 is not limited to three but is suitably variable in connection with the internal gear 2 and the sun gears 15 to 18. The damper of this invention is useful not only for the mechanisms for the tape accommodating portion of video tape decks but also for movable portions of various apparatus.

As already described, the damper of this invention, which comprises a multi-stage planetary gear assembly, can be made inherently compact in construction and achieves an greater speed increase than conventional devices comprising a spur gear assembly. Accordingly, when having a damping effect comparable or superior to that achieved by conventional devices, the present damper is much more compact in its entirety than the known devices. The damper can therefore be incorporated into video tape decks or like apparatus with a greatly reduced space.

Because all the gears are arranged around a single sun gear shaft, the damper can be assembled with extreme ease by placing the planetary gear units on the sun gear shaft with the sun gear of each unit fitted to the planetary gears of another unit and fitting the assembly into the damper case.

Furthermore, the damper case enclosing all the gears therein effectively confines the meshing noises of the gears therein. In other words, the group of gears which are arranged compactly can be accommodated in a case and can be easily sealed off. This muffles the gear noises with improved effectiveness. Further, a metal cap is press-fitted to the case main body, the cap suppresses the vibration of the gears delivered to the case to inhibit the noises even more effectively.

The one-way spring clutch coupling the input wheel to the input shaft enables the damper to function as such only when loaded in a specified direction, so that when the damping action is undesired for reverse rotation of the mechanism associated with the damper, the damper remains inoperative to render the mechanism smoothly operable.

The sun gear in the final stage, which has fitted therein an elongated bushing, is freely movable axially within a range provided by the resulting clearance. It is thereby made rotatable with stability despite the small torque involved in the rotation. This assures the desired damping action without bending.

These various advantages enhance the usefulness of the damper of this invention.

What is claimed is:

1. A damper comprising a damper case, an internal gear formed on the inner periphery of said damper case, a shaft means rotatably mounted in said damper case, planetary gear units provided around said shaft means and arranged in a plurality of stages axially thereof, each gear unit comprising a sun gear, a plurality of planetary gears and said internal gear, the planetary gear of the unit in the first stage being rotatably supported by said shaft means, the planetary gears of each of the units in the second and following stages being rotatably supported by the sun gear in the immediately preceding stage, actuation means rotatably mounted on said damping case and adapted to provide a damping effect, and clutch means operably disposed between said shaft means and said actuation means to connect said shaft means to said actuation means when said actuation means is rotated in one direction and to disconnect said shaft means from said actuation means when said actuation means is rotated in the opposite direction, said gear units being constructed and arranged to provide a multi-stage, series meshing engagement which thereby offers rotational resistance to said shaft means to thereby provide damping of said actuation means when said actuation means is rotated in said one direction, and to preclude said damping effect when said actuation means is rotated in the opposite direction.

2. A damper comprising a damper case having an end face, an internal gear formed on the inner periphery of said damper case, a sun gear shaft rotatably mounted in said damper case, an input shaft rotatably mounted on one end of said damper case in axial alignment with said sun gear shaft, planetary gear units provided around said sun gear shaft and arranged in a plurality of stages axially thereof, each gear unit comprising a sun gear, a plurality of planetary gears and said internal gear, the planetary gear of the unit in the first stage being rotatably supported by said input shaft, the planetary gears of each of the units in the second and following stages being rotatably supported by the sun gear in the immediately preceding stage, actuation means rotatably mounted on said damping case and adapted to provide a damping effect, and clutch means operably disposed between said input shaft and said actuation means to connect said input shaft to said actuation means when said actuation means is rotated in one direction and to disconnect said input shaft from said actuation means when said actuation means is rotated in the opposite direction, said gear units being constructed and arranged to provide a multi-stage, series meshing engagement which thereby offers rotational resistance to said input shaft to thereby provide damping of said actuation means when said actuation means is rotated in said one direction.

3. A damper according to claim 2, wherein said actuation means comprises an input wheel rotatably mounted on said damping case, said input wheel being adapted to be operably connected to a device which is to be provided with a damping effect, said input wheel being fixedly mounted on said input shaft, said input wheel and said input shaft each having means defining an indentation for receiving said clutch means.

4. A damper according to claim 3, wherein said indentation is partially defined by axially aligned circular portions on said input wheel and on said input shaft, said clutch means comprising a helical spring disposed over said axially aligned circular portions.

5. A damper according to claim 2, wherein said planetary gear of the unit in the first stage and said input shaft are integrally formed.

6. A damper according to claim 2, wherein said clutch means comprises a first metal pipe connected to said input shaft, a second metal pipe connected to said actuation means, and a square wire spring connecting said first and second metal pipes to provide a one-way clutch action.

7. A damper comprising a damper case having an end face, said damper case formed with an internal gear on its inner periphery, a sun gear shaft rotatably disposed in th center of the damper case, an input shaft mounted on one end of the sun gear shaft, planetary gear units provided around the sun gear shaft and arranged in a plurality of stages axially thereof, each gear unit comprising a sun gear, a plurality of planetary gears and the internal gear, thrust washers interposed between the sun gears of the planetary gear units and between said end face of the damper case and the last sun gear of the unit in the last stage, said last sun gear having fitted therein a thrust bearing having an axial length longer than that of said last sun gear by a specified dimension to form a clearance between said last sun gear and the washers on opposite sides thereof such that said last sun gear is movable axially thereof within the range of said clearance, the planetary gears of the unit in the first stage being rotatably supported by the input shaft, the planetary gears of each of the units in the second and following stages being rotatably supported by the sun gear of the unit in the immediate preceding stage to provide a multi-stage, series meshing engagement which thereby offers rotational resistance to said input shaft and provides damping of said input shaft.

* * * * *